(12) United States Patent
Müller

(10) Patent No.: US 7,886,769 B2
(45) Date of Patent: Feb. 15, 2011

(54) DIVERTER VALVE HAVING AN IMPROVED TRANSITION AND OUTLET PORT

(75) Inventor: Robert Müller, Daisendorf (DE)

(73) Assignee: Zeppelin Silos & Systems GmbH, Friedrichshafen (DE)

( * ) Notice: Subject to any disclaimer, the term of this patent is extended or adjusted under 35 U.S.C. 154(b) by 70 days.

(21) Appl. No.: 11/543,997

(22) Filed: Oct. 6, 2006

(65) Prior Publication Data

US 2007/0079882 A1      Apr. 12, 2007

(30) Foreign Application Priority Data

Oct. 6, 2005      (DE) .................. 10 2005 048 166

(51) Int. Cl.
*F16K 11/08* (2006.01)
(52) U.S. Cl. ..................................... 137/874
(58) Field of Classification Search ............. 137/872, 137/874, 876
See application file for complete search history.

(56) References Cited

U.S. PATENT DOCUMENTS

| 1,725,337 | A | * | 8/1929 | Burkhard | .............. 137/240 |
| 4,909,273 | A | * | 3/1990 | Heep et al. | ............ 137/240 |
| 4,952,100 | A | * | 8/1990 | Heep et al. | ............ 406/182 |
| 5,072,758 | A | * | 12/1991 | Krambrock | ............ 137/625.47 |
| 6,247,877 | B1 | | 6/2001 | Rost | |
| 6,601,610 | B1 | * | 8/2003 | Mitomo et al. | ......... 137/625.47 |

FOREIGN PATENT DOCUMENTS

| CA | 2068090 | | 11/1992 |
| DE | 3922240 | A1 | 1/1991 |
| DE | 41 02 008 | C2 | 7/1992 |
| DE | 41 14 949 | C1 | 10/1992 |
| DE | 19736484 | C2 | 3/1999 |
| DE | 102 19 989 | B3 | 1/2004 |

* cited by examiner

*Primary Examiner*—John Fox
(74) *Attorney, Agent, or Firm*—Browdy and Neimark, PLLC

(57) ABSTRACT

A diverter valve having an improved transition at the connecting branches, wherein one inlet and two outlet ports are formed and a cylindrical rotary valve incorporating a straight inner pipe is provided. In order to attain the smoothest possible transition between the rotary valve and inlet and outlet ports of the housing, the invention provides that all three inlet and outlet ports, as well as the respective opposed contour of the rotary valve bore are executed with the same shape, and that in the passage bore of the diverter valve in the region of the inlet and of the two outlet ports two pocket-like shaped surfaces on the housing that are formed mirror-symmetrical relative to the longitudinal center axis are worked into the material of the diverter valve in each case in the form of a pocket-like recess, wherein these shaped surfaces that are fixed to the housing have opposed shaped surfaces in the rotary valve connecting to them smoothly and seamlessly, which are worked-in recessed into the material of the rotary valve.

4 Claims, 6 Drawing Sheets

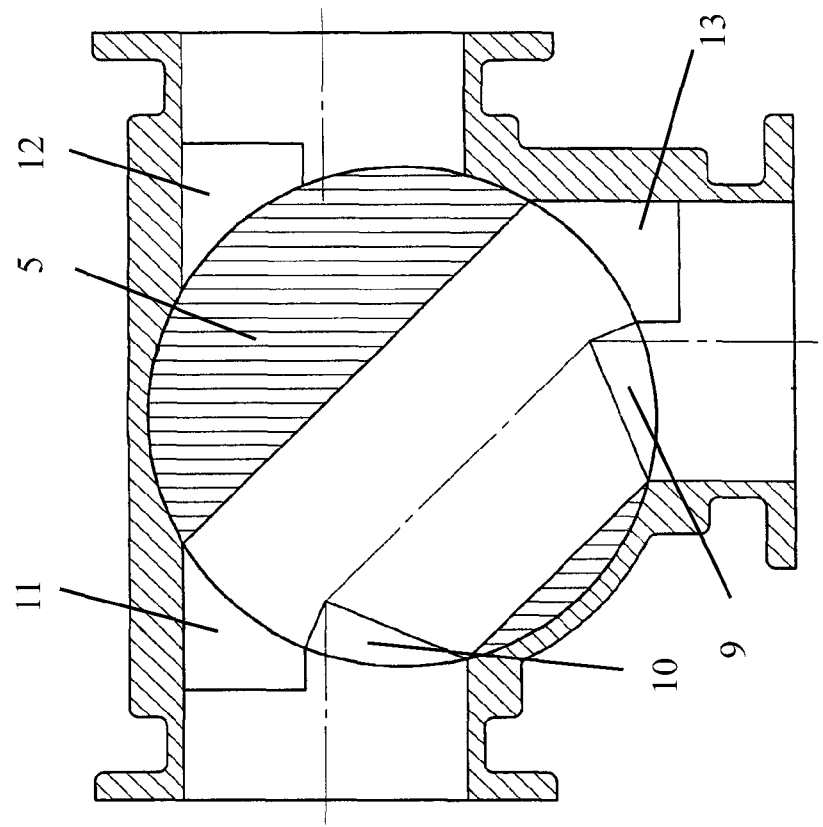
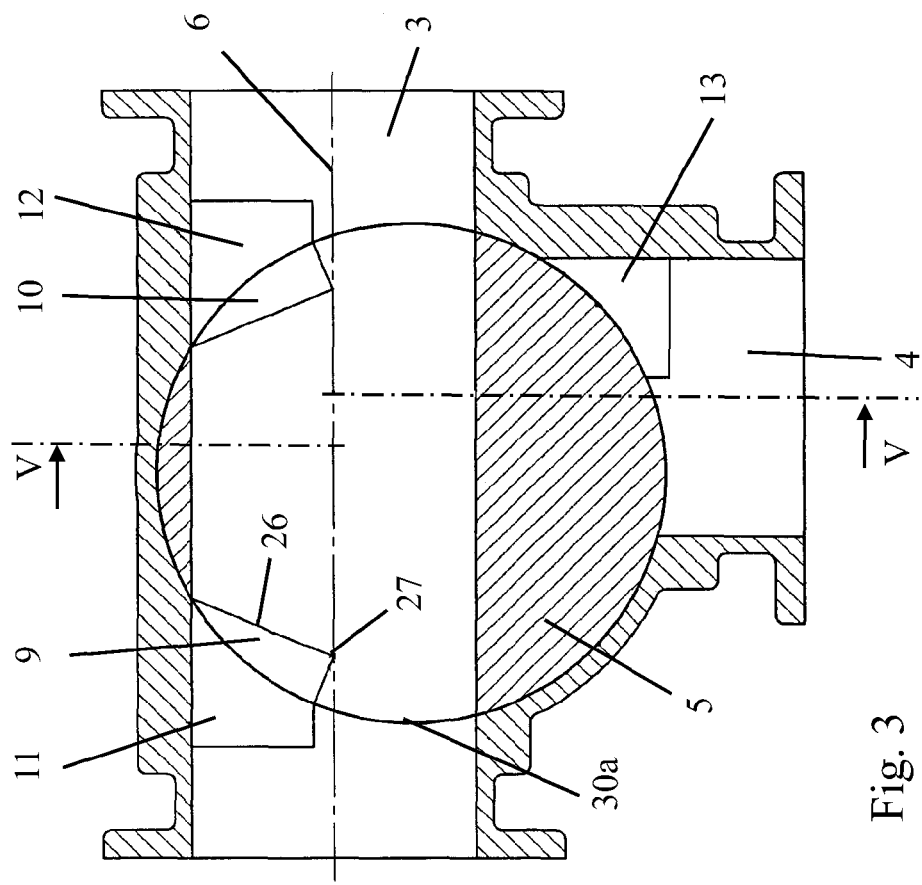
Fig. 4
Fig. 3

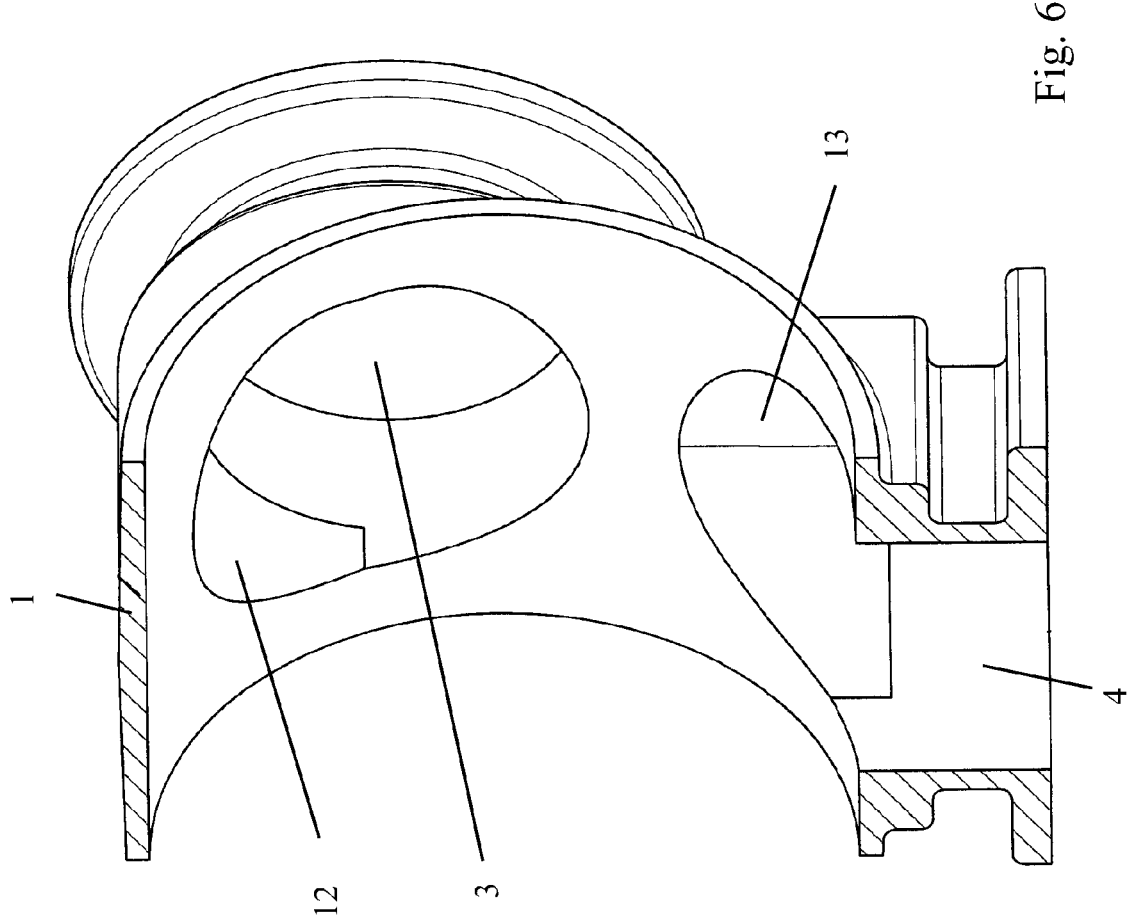

DIVERTER VALVE HAVING AN IMPROVED TRANSITION AND OUTLET PORT

BACKGROUND OF THE INVENTION

The invention relates to a diverter valve having an improved transition at the connecting branches, wherein one inlet and two outlet ports are formed and a rotary valve incorporating a straight inner pipe is provided.

The inlet of the diverter valve can accordingly be connected to the two outlet ports by means of the rotary valve in such a way that two different alternate discharge directions are possible.

PRIOR ART

The problematic nature of diverter valves of this type lies in the geometric discontinuity that results when the rotating member turns from parallelism into the angled outlet port or back, depending on which approach was favored by the design engineer.

In patent document DE 41 02 008 C2 it was proposed, through narrowing or widening in the inlet region, depending on the flow direction, to accept areas of reduced flow, with the shortcoming of potentially having to accept an intermixing of bulk material but having two smooth outlet ports in return.

In the older patent document DE 39 22 240 the pipe bend was moved into the rotary member, however, with the parallelism of inlet/outlet resulting in a heart-shaped special contour in the housing that was not manageable if, for example, a stainless-steel lining of the connecting branches was required in this region.

The difficulty consisted in that, in the case of a stainless-steel lining of the connecting branches, a sprayed-on resurfacing layer had to be applied, which significantly limited the possible applications for various bulk material and caused a greater expenditure of labor.

Up to now, the geometric discontinuity could be reduced only by choosing ball-like rotary members, with the difficulty that the housings, for assembly reasons, had to be constructed as two parts. This makes it extremely difficult to install housing seals.

OBJECT AND SUMMARY OF THE INVENTION

The present invention therefore has as its object to improve a diverter valve of the above type in such a way that when the diverter valve is used as a diverting or converging means, an absolutely smooth, nearly 100% round transition between the connecting branches of the housing and passage bore of the rotary valve is achieved with the simplest design and production technique and very inexpensive construction.

To meet this object, the invention is characterized by the technical teaching of claim 1.

The principal feature of the invention is that a geometric discontinuity can be eliminated also in diverter valves with cylindrical rotary valves if all three inlet and outlet ports, as well as the respective opposed contour of the rotary valve bore are executed with the same shape.

In accordance with the invention, in the diverter valve, two pocket-like shaped surfaces on the housing that are formed mirror-symmetrical relative to the longitudinal center axis are worked into the material of the diverter valve in the form of a pocket-shaped recess in each case in the region of the inlet and of the two outlet ports of the housing, in such a way that these shaped surfaces that are fixed to the housing have opposed shaped surfaces in the rotary valve connecting to them smoothly and seamlessly, which are worked-in recessed into the material of the rotary valve.

This has the advantageous consequence that, in the case of a modular construction of the diverter valve due to bulk-material-based requirements, different materials and a great variety of different seal designs may be used without impacting the nearly 100% round, smooth geometry of the diverter valve in both positions, regardless of whether it is based on an outlet port angle of 45° or 90°. This creates a universal diverter valve which, starting from a basic design with a specified geometry that is unobjectionable from a production engineering aspect, can fulfil any requirement of the bulk-material handling industry.

The same shape of all three transition surfaces is obtained in such a way that the machining tool is inserted at the chosen angle of the branch of, e.g., 45° into the passage bore of the rotary valve from both sides in such a way that the tool terminates the machining process exactly at the level of the center line at the point at which the machining line forms half an ellipsoidal section with the rotary valve bore. The resulting contour is transferred to the three inlet and outlet ports of the diverter valve housing through machining or mold casting, so that when the rotary valve changes positions from straight to outlet port or back, the same shapes are congruent with one another.

This has the advantage that multiple options exist for machining the shaped surfaces on the housing.

In a first embodiment, provision may be made for the intended shaped surfaces to be provided already in the casting mold and then finished by means of an appropriate metal-cutting process, in order to thus achieve a seamless, smooth transition between the shaped surfaces on the rotary valve and the shaped surfaces of the housing.

In another embodiment, provision may be made that the housing of the diverter valve has no special integrally cast surfaces and the shaped surfaces to be added are provided by means of a subsequent metal-cutting process.

This is a significant advantage as compared to the prior art (e.g., DE 39 22 240 A1), since a smooth transition could not be achieved there.

With reference to FIG. 3 of the above-mentioned printed publication, the present invention is now able to dispense with and eliminate the discontinuity-afflicted transitions 34 depicted in that figure, while the other transition regions 32—depicted there—are replaced in the present invention by shaped surfaces that transition into each other contour-free and smoothly.

The subject matter of the present invention is derived not only from the subject matter of the individual claims, but also from the combination of the individual claims among each other.

All information and features disclosed in the documentation, including in the abstract, especially the three-dimensional design depicted in the drawing, are claimed as essential to the invention to the extent that they are novel with respect to the prior art, either individually or in combination.

BRIEF DESCRIPTION OF THE DRAWINGS

In the following text the invention will be explained in more detail based on drawings that show only a single embodiment. Additional characteristics that are essential to the invention and advantages of the invention will become apparent from the drawings and from their description, with the figures showing as follows:

FIG. 3: a section through a second embodiment of a diverter valve with a 90° outlet port in the first passage position;

FIG. 4: a section through a diverter valve according to FIG. 3 in the second outlet position;

FIG. 6: a perspective view in the direction of the arrow VI of FIG. 5 into the housing of the diverter valve;

DETAILED DESCRIPTION OF THE PREFERRED EMBODIMENT OF THE INVENTION

Figures 1, 2:
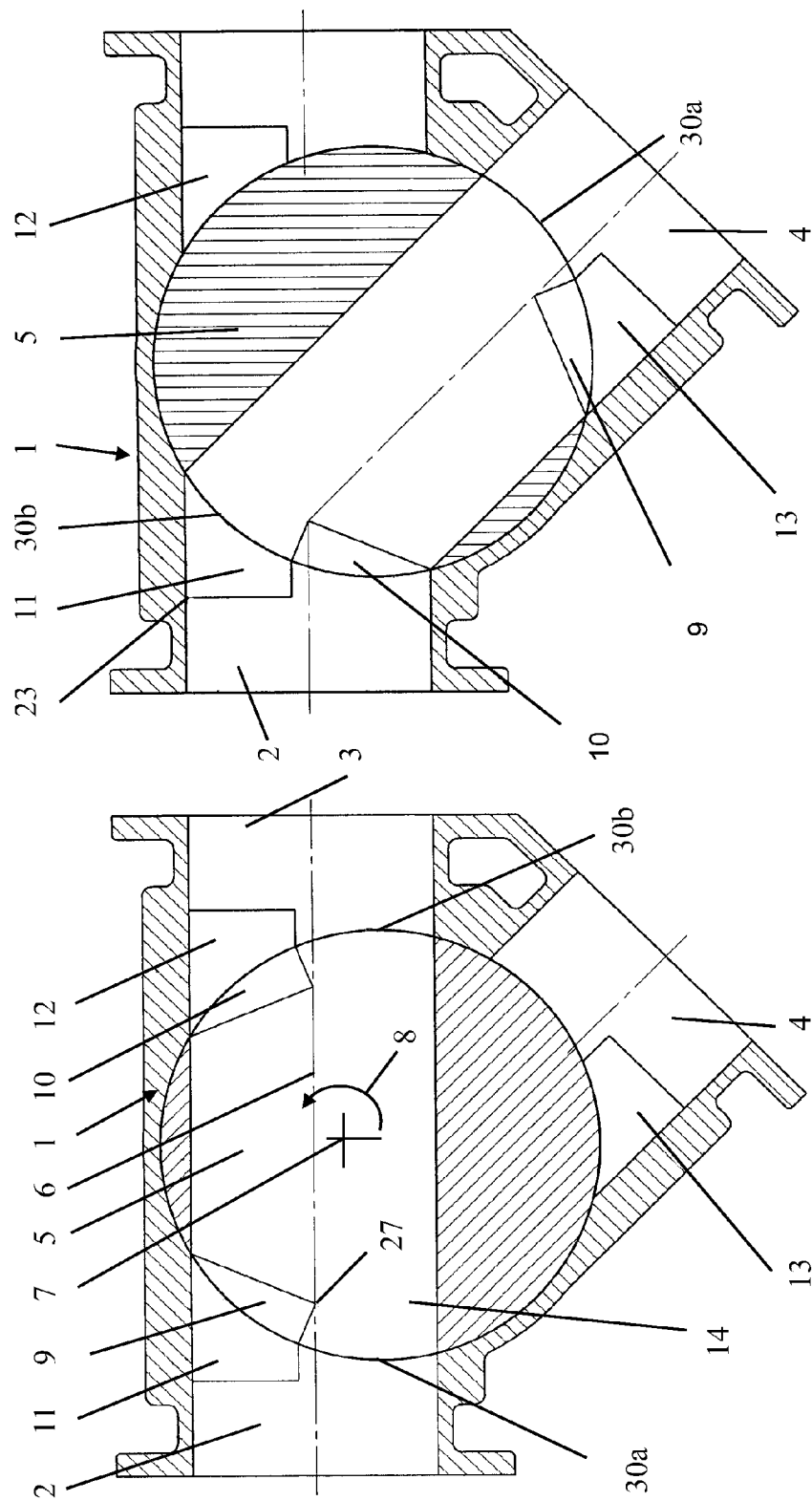
FIG. 1: a section through a first embodiment of a diverter valve in the first passage position.
FIG. 2: a section through the diverter valve according to FIG. 1 in the second passage position.

Depicted in FIGS. 1 and 2 is a diverter valve 1 having an inlet 2 and two outlet ports 3, 4, which are arranged at an angle of 45° relative to each other.

The housing of the diverter valve 1 has a rotary valve 5 rotatably supported in the region of the axis of rotation 7, for example in the direction of the arrow 8, with the goal to connect an inlet 2 as desired either to the outlet port 3 or to the outlet port 4.

The advantage of the invention now lies in that, in the region of the half-pipe passage 30, one achieves a virtually completely smooth and seamless terete region between the inlet 2 and passage bore 14 of the rotary valve 5.

In accordance with the invention, the inlet and outlet port regions 2, 3, 4 of the housing of the diverter valve 1 that are fixed to the housing, now have shaped surfaces 11, 12, 13 worked into them that form a smooth transition to the associated surfaces in the region of the passage bore 14 of the rotary valve 5.

It is important in this context that these shaped surfaces 11, 12, 13 that are fixed to the housing have associated shaped surfaces 9, 10 arranged opposite to them in the rotary valve, which complete each other in their shapes, extending seamlessly and thus forming a continuous, smooth transition.

Figure 9:
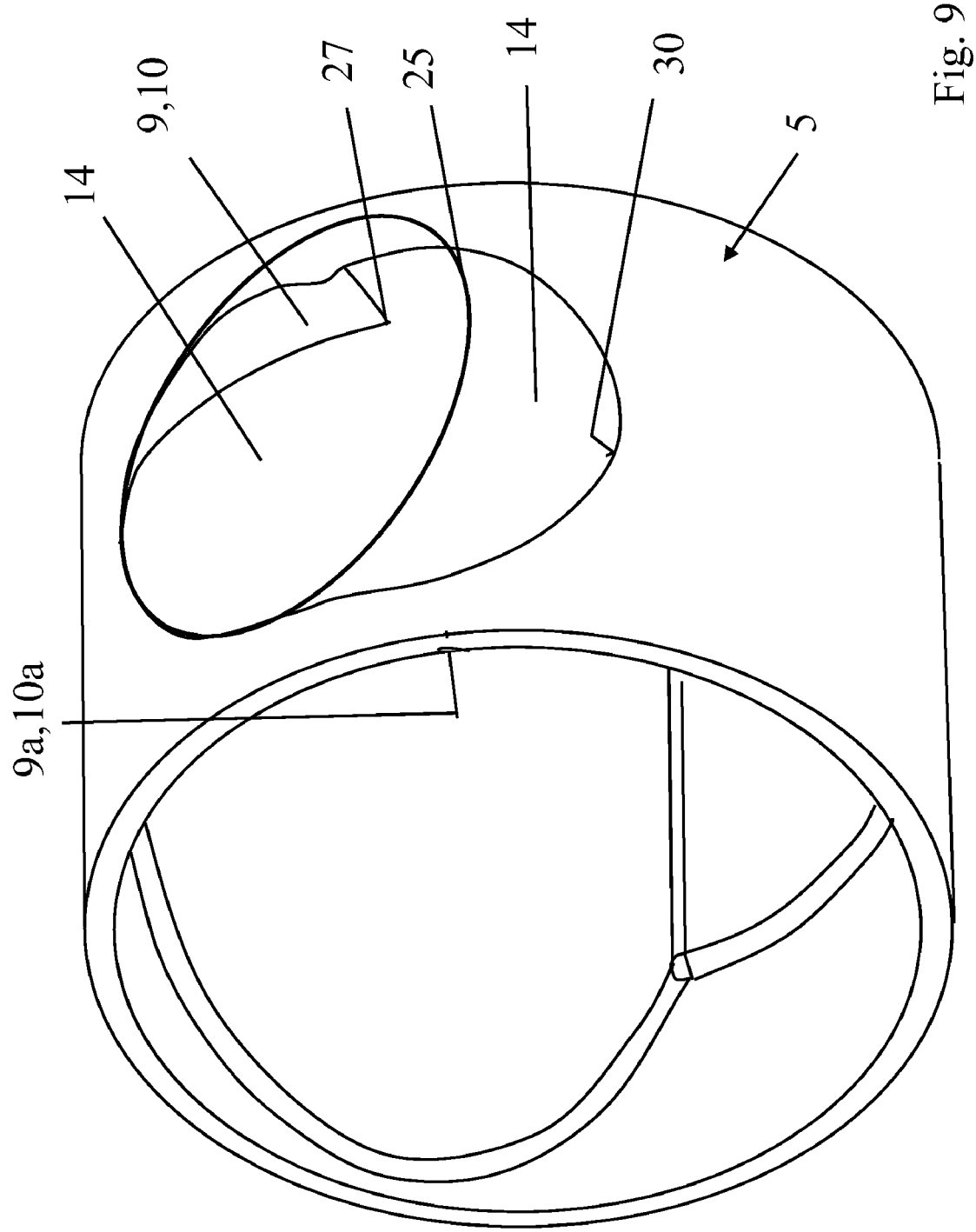
FIG. 9: a perspective rendering of the rotary valve according to FIG. 7 in a simplified rendering.

Since the rotary valve itself is rotation-symmetrical, each shaped surface 9, 10 on the rotary valve is provided in duplicate, with the respective shaped surface symmetrical to them having been marked with 9a and 10a as shown in FIG. 9.

The longitudinal axis 6 through the passage bore 14 is in alignment with the longitudinal axes through the inlet 2 and through the associated outlets 3 and 4.

This is depicted in FIGS. 1 and 2, where it is apparent that the half-pipe passage 30a, which was previously aligned with the inlet 2, forming a continuous smooth transition, now moves, when the inlet 2 is switched to the outlet port 4, into the outlet port 4, while the half-pipe passage 30b has moved in an analogous manner into the inlet 2 according to FIG. 2.

Since this half-pipe passage 30a, 30b is situated at an angle relative to the inlet 2, the shaped surface of the housing coincides congruently with the half-pipe passage 30b. As a result, there is a smooth transition in which no abutting edges exists.

The same relationships also apply to FIGS. 3 and 4, which merely show in deviation from the example embodiment of FIGS. 1 and 2 a diverter valve having a 90° outlet port 4.

These relationships also apply for the lower portion of the passage in analogous manner, as the half-pipe passage from the housing connects congruently and smoothly to the associated shaped surface.

It has thus become possible for the first time with a turning process (i.e., with metal-shaping machining of the rotary valve and housing) to achieve congruent contours between the contour in the housing and passage bore of the rotary valve in all outlet port positions of the diverter valve.

Figure 5:
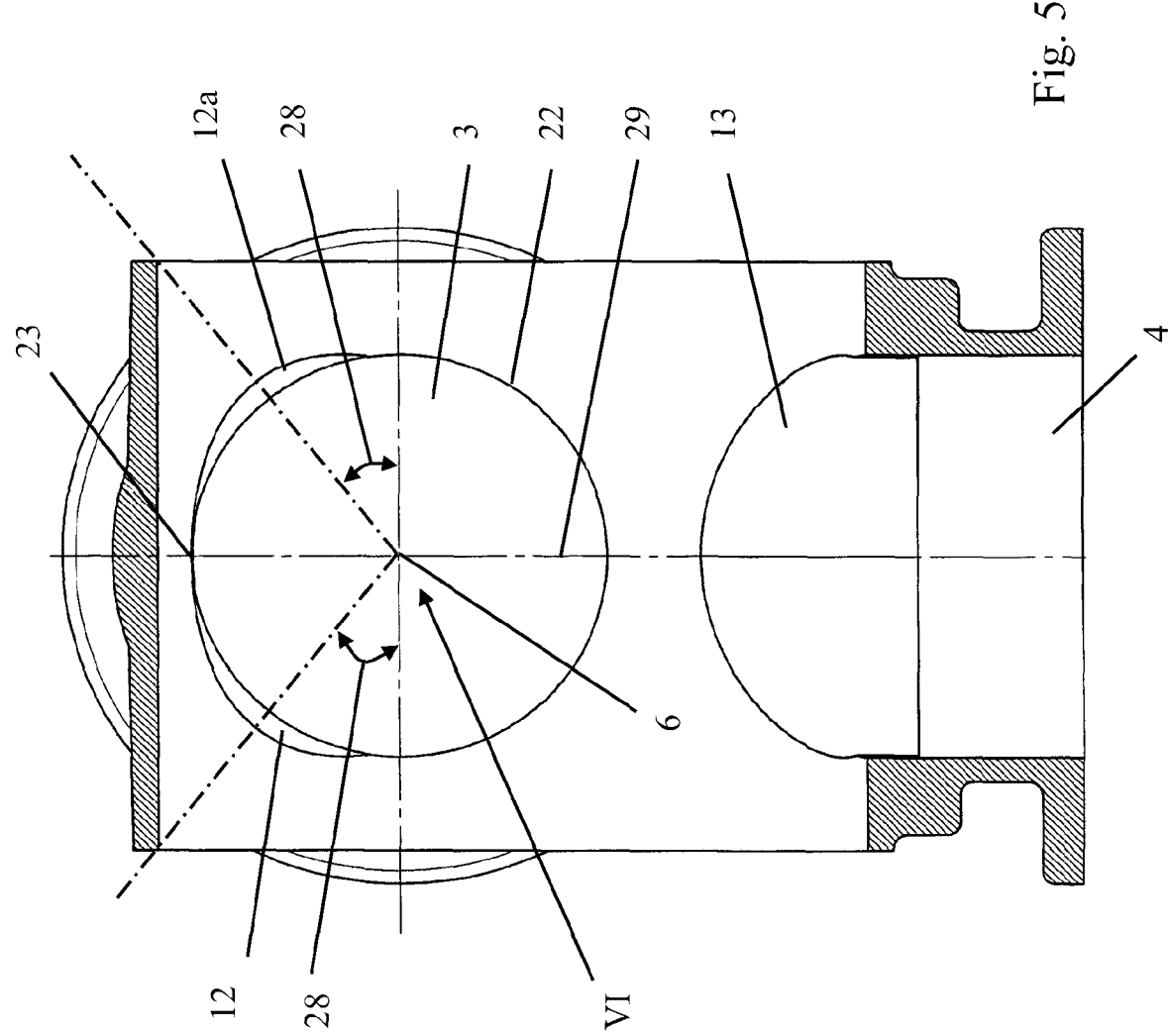
FIG. 5: a section according to line V-V in FIG. 3, with the rotary valve not depicted.

Additional details will become apparent from FIG. 5, which is a section along the line V-V in FIG. 3.

The rotary valve 5 has been removed there and it is apparent that approximately ear-like shaped surfaces 12 and 12a are provided in the upper region of the passage bore of the housing, with the center angle through these shaped surfaces 12 and 12a corresponding, for example, to an angle 28 of 38°. When looking in the direction opposite to the line V-V in FIG. 3, ear-like shaped surfaces 11 and 11a would be seen.

This angle of 38° is dependent upon the chosen outlet port angle, i.e., whether it is a 45° or a 90° diverter valve.

A contact point 23 is created between the two shaped surfaces 12, 12a, which rests on the circumferential surface 16 of the rotary valve 5 in a sealing manner.

Furthermore, it is apparent that the two shaped surfaces 12 and 12a are mirror-symmetrical relative to the longitudinal center axis 29 (or equivalently to a vertical plane through the axis of the inlet port 2) and are provided radially outward from the boundary line 22 of the passage bore, widening toward the outside.

FIG. 5 also shows that the shaped surface 13 of the housing in the lower outlet port 4 is also completed from two partial surfaces situated mirror-symmetrical relative to the center longitudinal axis 29, which, for reasons of simplification, are not denoted with the letter a.

FIG. 6 shows a perspective view toward the outlet port of the diverter valve 1, where it is apparent that the shaped surface 12 on the left is provided in the upper region. The shaped surface 12a on the right is obscured in the drawing.

Figure 8:
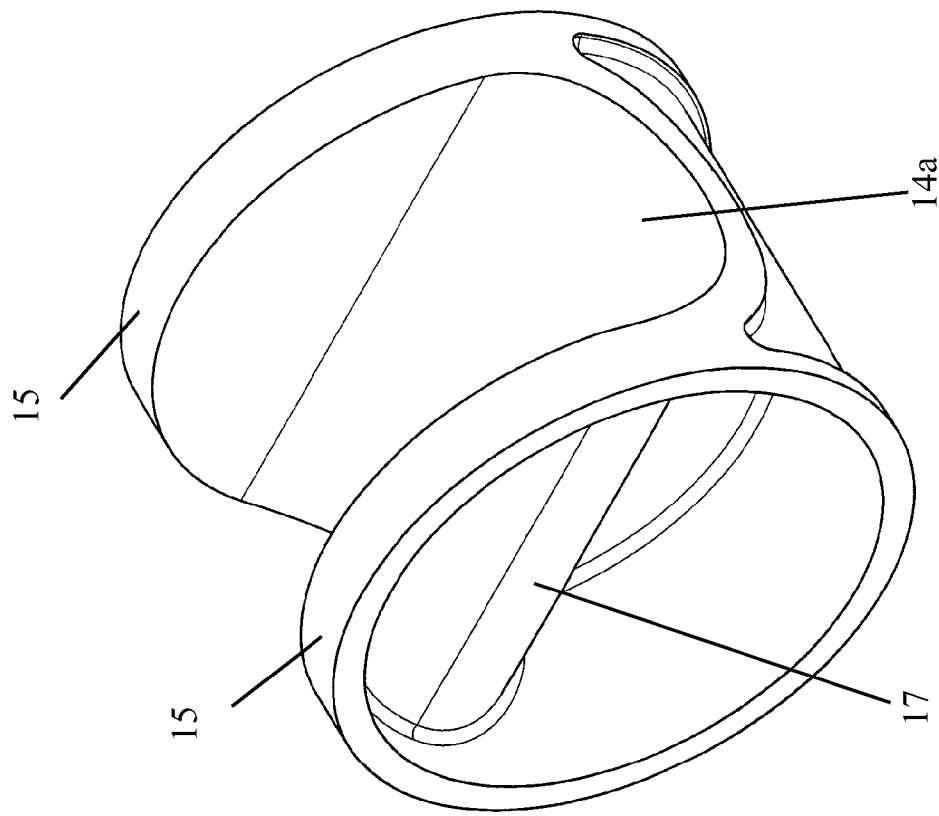
FIG. 8: a perspective rendering of a rotary valve in the second embodiment.
Figure 7:
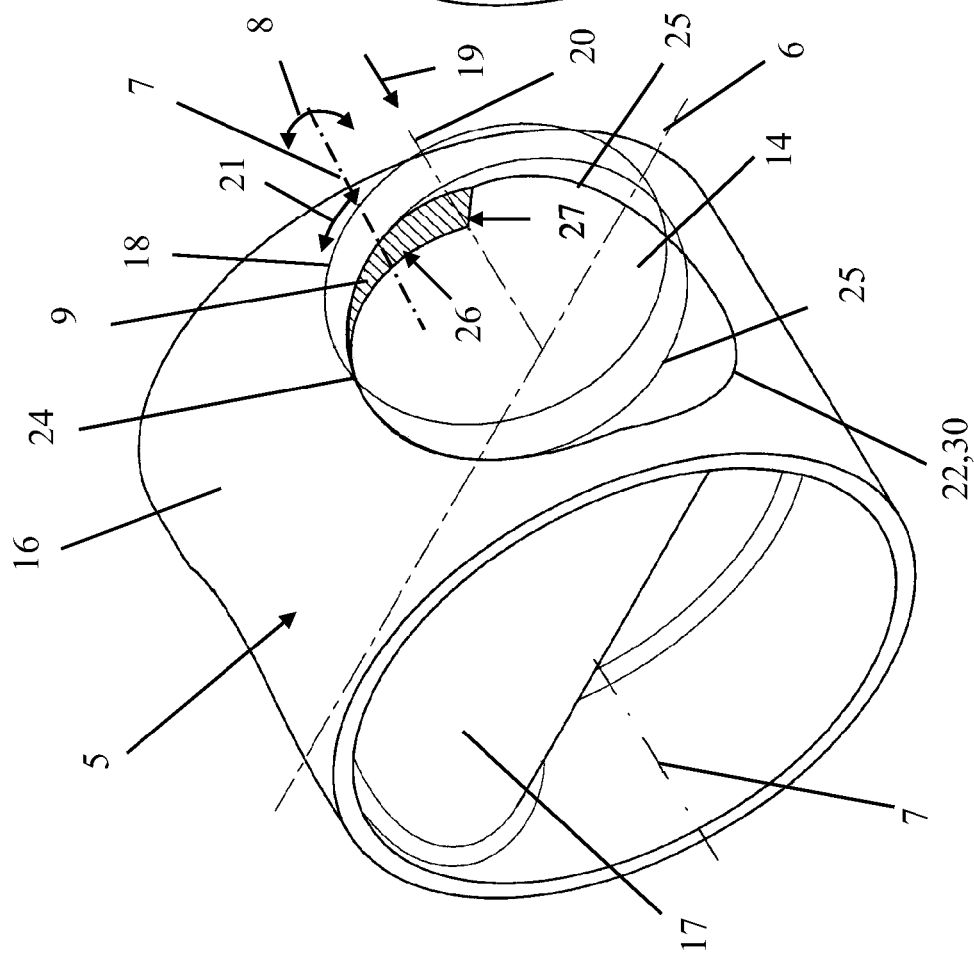
FIG. 7: a perspective rendering of a rotary valve in thee first embodiment.

Additional details of different rotary valve types are apparent from FIGS. 7 and 8, the rotary valve according to FIG. 8 being a so-called rotary powder valve. These are intended to convey materials that cake easily and it is apparent that the previously provided circumferential surface 16 of the rotary valve 5 is minimized. The roof of the circumferential surface was removed so that only lateral contact surfaces 15 remain for a rotary valve shown in FIG. 8, and consequently a half-open passage bore 14a.

In other respects, however, the same reference numerals apply to the same parts. The shaped surfaces 9 and 10 are accordingly eliminated for the rotary valve according to FIG. 8 as these are no longer necessary.

And the shaped surfaces 11, 12, 13 inside the housing, however, are still provided, to continue to maintain the adaptations in the form of the half-pipe passages 30a, 30b as described based on FIGS. 1 and 2.

For reasons of simplification, any seals in the region of the rotary valves according to FIGS. 7 and 8 are not shown, which are suitable to rest against the inside of the diverter valve 1 in a sealing manner.

Furthermore, for reasons of simplification, it is not depicted that seals may also exist in the housing in the region of the inlet 2 and the outlet ports 3, 4, which rest against the outer circumference of the rotary valve 5 in a sealing manner.

In FIG. 7 the side wall 17 of the rotary valve 5 is shown inwardly reduced for reasons of material savings, meaning that corresponding milled-down regions are provided in order to save solid material in this area.

Material savings of this type may also already be provided for in the casting mold.

It is important that a machining tool is now inserted in the region of the passage bore 14 in the direction of the arrow 19 that follows the movement curve 18.

As a rule, this will be a milling cutter that follows this movement curve 18 and is operated in semi-circular movements 21 in the process.

The outer boundary of the movement curve for the milling cutter is illustrated here by the movement curve 18 and the inner boundary is illustrated by the machining circle 25.

It is thus inserted from both sides into the passage bore 14 of the rotary valve and terminates the machining process exactly at the level of the center line at position 27 at the point at which the movement curve or machining line 18 forms half an ellipsoidal section with the rotary valve bore 14.

This ellipsoidal section is represented by the boundary line 26 in FIG. 7. This accordingly produces at the inlet and outlet of the rotary valve two shaped surfaces 9a and 10, 10a in each case that are minor-symmetrical to each other, with the mirror-symmetrical shaped surface 9a obscured in FIG. 7.

This is depicted in FIG. 9, where it is apparent that the shaped surface 9 has an associated (obscured) mirror-symmetrical shaped surface 9a.

For reasons of simplicity, it is also indicated in FIG. 9 that the shaped surface 10 on the opposite side is provided in the same manner. This, consequently, produces the shaped surfaces 10 and 10a.

The line 20 in this case forms the direction of movement of the milling cutter in the direction of the arrow 19, in such a way that this line is directed, for example, at an angle of 45° relative to the longitudinal axis 6 of the passage bore 14.

A point on hemiellipsoidal shaped surface 9, 10 is located in this case at position 27 on this line 20. The milling cutter in this case starts the metal-cutting process from the starting point 24 to create the shaped surfaces 9, 10.

In a reversal of the machining direction, the milling finger may also be applied at the point 24 parallel to the center line 6 and machining may be performed from this side. It then tilts about its lateral axis.

The inventive measures have the advantage that, due to the providing of shaped surfaces in the upper region of the inlet 2 and outlet ports 3, 4, in each case, these shaped surfaces either have an associated half-pipe passage in the rotary valve or likewise smoothly connecting hemiellipsoidal shaped surfaces 9, 10 in the rotary valve.

A discontinuity in the channel has therefore been ruled out in all rotational positions.

Since only shaped surfaces are situated across from each other, relatively flat pockets are created that do not represent any bag-like widened regions, so that there is no risk of granules settling and becoming caught in these pockets. At a nominal width of 80 mm of a diverter valve, the depth of a pocket of this type is only approximately 2 mm. At a nominal width of approximately 250 mm, the depth of the pocket at approximately its deepest point is only 15 mm.

DRAWING LEGEND

1 diverter valve
2 inlet
3 outlet port
4 outlet port
5 rotary disk
6 longitudinal axis
7 axis of rotation
8 direction of arrow
9 shaped surface (rotary disk)
  9a
10 shaped surface (rotary valve)
  10a
11 shaped surface (housing)
12 shaped surface
13 shaped surface (housing)
14 passage bore
  14a
15 contact surface
16 circumferential surface
17 side wall
18 movement curve of milling cutter
19 direction of arrow
20 line
21 semi-circular movement
22 boundary line (passage bore)
23 point of use
24 starting point
25 machining circle
26 boundary of ellipsoidal section
27 position
28 angle (e.g., 38°)
29 longitudinal center axis
30 half-pipe passage
  a, b (rotary valve)

What is claimed is:

1. A diverter valve (1) having an improved transition at the connecting branches, comprising a housing having one inlet port (2) and a first outlet port (3) and a second outlet port (4), the second outlet port (4) formed at an angle with respect to the first outlet port (3), the inlet port (2) having a bore axis, and a cylindrical rotary valve (5) rotatable within the housing, the cylindrical rotary valve (5) comprising a straight inner pipe having a bore (14) defining an inlet and an outlet of the valve, said bore (14) connecting the inlet port (2) to either of the first or second outlet ports (3, 4) to provide through-flow positions of the valve (5), wherein in the region of the inlet port (2) and of the first outlet port (3), two pocket-like shaped recessed surfaces (11, 11a, 12, 12a,) are formed on the housing, and in the region of the second outlet port (4), only one pocket-like shaped recessed surface (13) is formed on the housing, the rotary valve (5) including pairs of pocket-like shaped recessed surfaces (9, 9a, 10, 10a) in the inner surface of the valve (5) and positioned at the inlet and outlet of the valve (5), each of the pairs of the recessed surfaces in the valve (5) being mirror-symmetrical relative to the longitudinal plane when the valve is in a through-flow position, the pairs of recessed surfaces on the housing and valve facilitating movement of material through the diverter valve (1) at each through-flow position of the valve (5).

2. A diverter valve according to claim 1, wherein the valve (5) has a longitudinal axis (6) through the bore (14), each of the outlet ports (3, 4) has a longitudinal axis, and the longitudinal axis of the valve bore (14) being in alignment with the longitudinal axes of each of the outlet ports (3, 4) at each through-flow position of the valve (5).

3. A diverter valve according to claim 1, wherein the shaped recessed surfaces (11, 11a) of the inlet port (2) are provided in the upper region of the inlet port (2) of the housing, each of said shaped recessed surfaces (11, 11a) having a middle, the angle of a line through the middle of these shaped surfaces (11, 11a) to the inlet bore axis corresponding to an angle (28) of 38° when the housing has an outlet port (4) positioned at an angle of 45° from the inlet bore longitudinal axis.

4. A diverter valve according to claim 1, wherein the two shaped recessed surfaces (11, 11a) of the housing inlet port (2) are provided radially outward from the boundary line (22) of the inlet port (2).

* * * * *